United States Patent Office

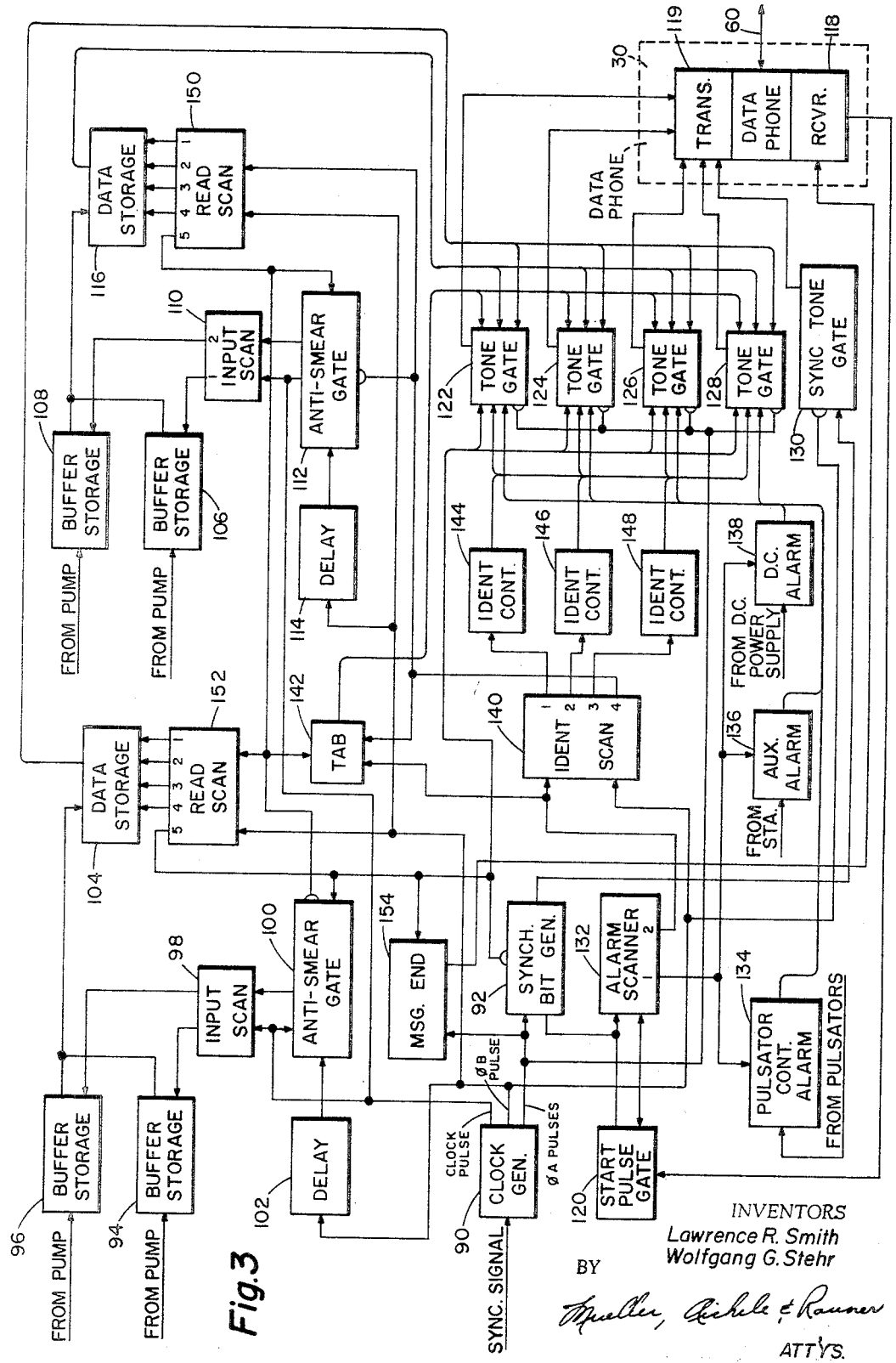

3,400,378
Patented Sept. 3, 1968

3,400,378
DATA ACQUISITION SYSTEM WITH PLURAL SCANNERS AT PLURAL REMOTE STATIONS
Lawrence R. Smith, Phoenix, and Wolfgang G. Stehr, Tempe, Ariz., assignors to Motorola, Inc., Franklin Park, Ill., a corporation of Illinois
Filed Oct. 22, 1965, Ser. No. 501,303
5 Claims. (Cl. 340—172.5)

ABSTRACT OF THE DISCLOSURE

A data acquisition system having a central station connected to a plurality of remote stations through telephone type communication channels. Central station automatically dials a remote station for the transmission of data. Each remote station has a plurality of data stores which are coupled through scanners to a transmitter for transmitting the data sequentially to the central station. If a remote station did not answer a telephone call, central station automatically redials a predetermined number of times. After the predetermined times of redialling, central station makes a record that a particular remote station could not be reached. Alarm information is also transmitted from remote stations to central station. The receivers of the various stations are decoupled from the communication network whenever it is transmitting. Scanners initiate end of message operation of each of the remote stations.

---

This invention relates to systems for acquiring data from remote points and in particular to systems capable of transmitting data over existing telephone lines.

There are many commercial operations which require the gathering of data from an unusually large number of remote points, either by a personal visit to the remote point to record the data required or by the use of remote communication facilities. Public utility companies for example have many customers scattered over a wide area. These companies are required to manually read meters located throughout their service areas in order to determine charges to the customer.

Many companies deliver their products to smaller companies for resale and it would be desirable to have up-to-date records of sales made by the smaller companies. For example, oil companies deliver their products to small petroleum bulk plants and depots, barge and tanker unloading terminals and from there to retail service stations. At the present time, many service stations are billed for gasoline and other products on the basis of the amount delivered to them over a specific billing period. Since the credit rating of individual stations varies, the amount delivered to some stations is less than the capacity of the stations, requiring more frequent deliveries in a given period of time. The daily totals of the amount of a given product actually sold by service stations to consumers are not ordinarily gathered and are not available to central business offices of the oil companies. If statistics of actual sales by retail stations could be obtained rapidly by data acquisition equipment, they could be used to advantage in several ways.

Dispatching of deliveries for large geographical areas could be accomplished from one central office, and deliveries could be planned to make more efficient use of equipment and personnel. At the present time, the dispatcher can only estimate the level of gasoline in storage tanks at the stations unless calls are made to the stations to find out whether additional deliveries are required. If the dispatcher knows the amount of products sold since the last delivery to a station, he can determine at any time the amount of new products which can be delivered to the station and he can plan deliveries for maximum efficiency. Oil companies can make large deliveries to the retail station while retaining title to all but a small quantity of the products delivered. As the products are sold the station can be billed and more of the product released. In this manner the oil company can limit the credit of each station individually while still being able to make economical, large quantity deliveries of the products. Also the effect of sales promotions could be ascertained immediately and accurately.

One form of communications which is already installed in all parts of the country and which is particularly available to business use is the telephone. In the oil industry, for example, it would be practical to have a central dispatcher determine the product delivery requirements of a large number of stations by using a telephone to periodically determine the number of gallons of various products sold by a station. The central station could also use the telephone to release title to products stored at the station as the products are sold and paid for by the station.

Using a telephone in the normal manner, that is, by manually dialing the remote station and transmitting the required data by voice, is limited in usefulness. The personnel at the station must keep up-to-date records of the products sold and they must also be available to answer the telephone and transmit this data. Since the personnel initiating the calls at the central station have no means of knowing the situation at the remote station, the calls will often be incomplete as the personnel at the remote station will be busy and unable to answer the telephone, or the telephone may be in use. It is also desirable to use telephone service during periods of low use as fewer busy signals will be received and, if long distances are involved, the telephone rates will be lower. However, the periods of low telephone use occur during the early morning hours when most stations are closed.

It is therefore, an object of this invention to provide an improved data acquisition system for monitoring product sales from a large number of remote stations over existing communication facilities and which is low in cost and economical in operation.

Another object of this invention is the provision of a data acquisition system for monitoring the sales of a plurality of different products at each remote station.

Another object of this invention is to provide a data acquisition system using existing telephone facilities to interrogate a remote station and which will automatically record data received and redial unanswered calls.

Another object of this invention is to provide a data acquisition system which records alarm information at a central station in the event of a malfunction at the remote station.

A feature of this invention is the provision of a data acquisition system having a permanent memory for storing telephone numbers of remote stations to be interrogated and a semipermanent memory, encoding means and programming means which sequentially transfer telephone numbers stored in the permanent memory to dialing circuitry for transmission over telephone lines.

Another feature of this invention is the provision of a data acquisition system having counter means and programming means for redialing unanswered numbers a predetermined number of times and a permanent memory for the storage of the telephone numbers of stations which do not answer a call.

Another feature of this invention is the provision of a data acquisition system having buffer storage means and scanning means at the remote stations for combining, in a single storage register, the output of a plurality of dispensers of one product.

Another feature of this invention is the provision of a data acquisition system having a plurality of data storage means positioned at a remote station for storing data about different products and scanning means for reading the counters sequentially for transmitting said data over telephone lines to a central station.

Another feature of this invention is the provision of a data acquisition system having alarm means positioned at remote stations for transmitting indications of malfunction to a central station.

In the drawings:

FIG. 3 is a block diagram of remote station equipment included in the system of FIG. 1.

In practicing this invention data phones are provided at a central station and at each remote station which is to be interrogated. The data phones used are commercially available equipment, and are capable of sending data information in the form of tone signals over existing telephone facilities. At each remote station the data required is stored in a permanent memory. The telephone number of each remote station is stored in a permanent memory at the central station. Programming means and automatic dialing equipment at the central station read the telephone numbers from the permanent memory sequentially to dial each remote station. Upon answering a call a remote station sends back the data stored in its memory. This data is stored in memories located at the central station. After completing a call to a remote station the central station automatically dials another number contained in its permanent memory of remote station telephone numbers. This sequence continues until all the desired remote stations have been interrogated.

Provision is made at the remote station for monitoring the sales of more than one product and also for monitoring the sales of a single product from a plurality of product dispensers. Provision is also made at the remote station for alarm systems to monitor the operation of the remote equipment and for transmitting the status of these alarms each time the station is interrogated. Provision is made at the central station for redialing unanswered calls. If no answer is received after a predetermined number of redials the telephone number of the remote station that does not answer is recorded in a permanent memory at the central station for subsequent action.

Figure 1:
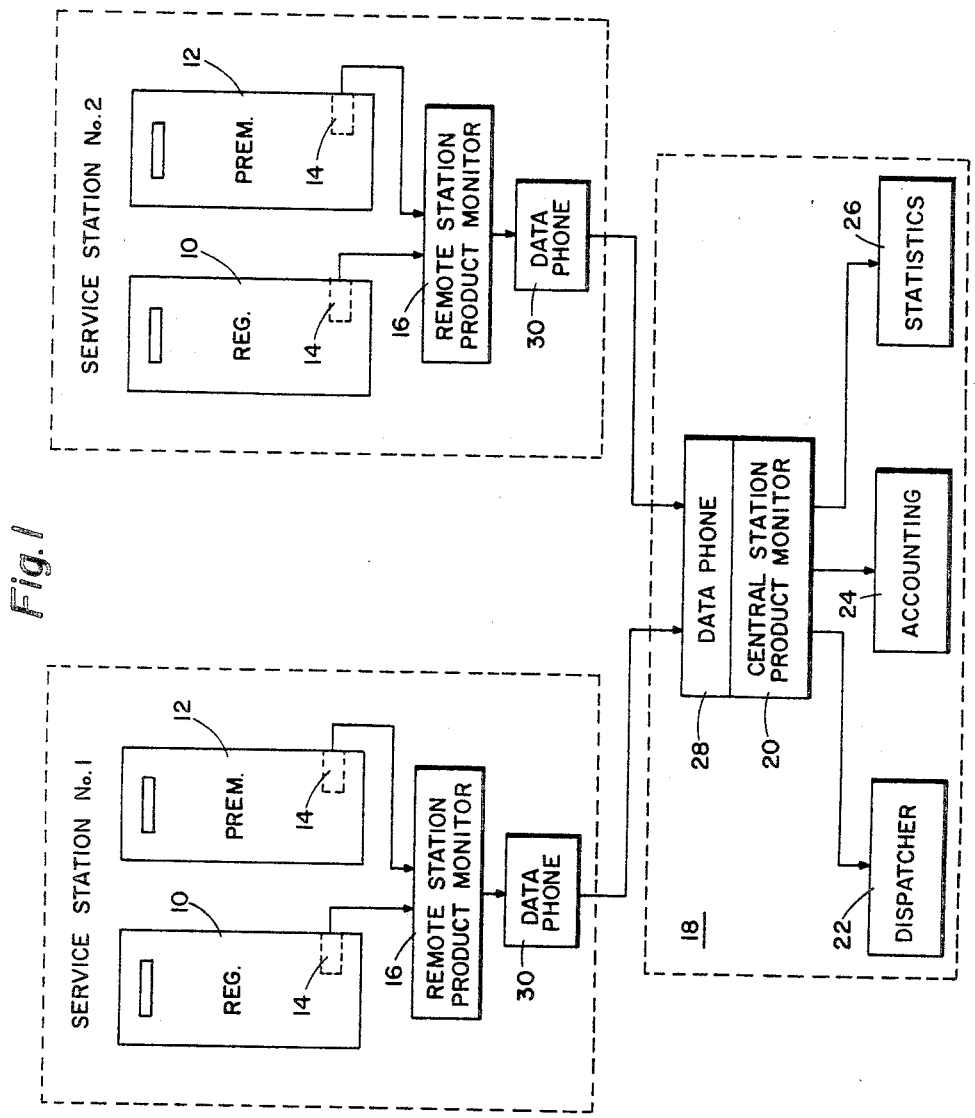
FIG. 1 is a simplified flow diagram for a data acquisition system applied to gasoline retail stations.

FIG. 1 illustrates a retail gasoline distribution system using the features of this invention. In the system of FIG. 1 two service stations are monitored by a central station. While only two stations are shown in this example, the number of stations is not limited. Each station is shown as selling two products, in this example, regular gasoline from pump 10 and premium gasoline from pump 12. While only one pump dispensing each of the two products is shown at each station, the system will operate with more than one pump for each product. Also the sales of more than two products at each station can be monitored. The operation of these features will be explained in a subsequent portion of the specification. Metering devices 14, positioned at each pump, develop signals proportional to the amount of the product dispensed. These signals are transmitted to remote station product monitor 16 where the sales information is stored.

Central station 18 contains a central station product monitor 20 which controls the interrogation of the individual service stations and records the data obtained therefrom. In addition, the output of the central station product monitor 20 may be coupled to various accounting machines 22, 24 and 26 for use by the product dispatcher, accounting or statistical analysis. The services using the output of central station product monitor 20 may be positioned at the central station or may be located elsewhere.

In operation telephone numbers stored in central station product monitor 20 are automatically coupled to commercially available data phone equipment 28 to dial the remote station being interrogated. A commercially available data phone 30, located at the remote service station receives the call from the central station product monitor and initiates a reply signal from remote station product monitor 16. The reply signal from the remote station product monitor 16 is received by central station product monitor 20 where it is recorded. Upon completion of the data transmission, the telephone connection between the remote service station and the central station 18 is broken and the central station proceeds to dial another remote station. This operation continues until all the remote stations have been interrogated. Provision is made for redialing in the event the remote station phone is busy or no answer is received. Provision is also made for recording the telephone numbers of remote stations which could not be reached by the central station product monitor. In an average gasoline station system the time to complete a call is from 3 to 5 seconds.

Figure 2:
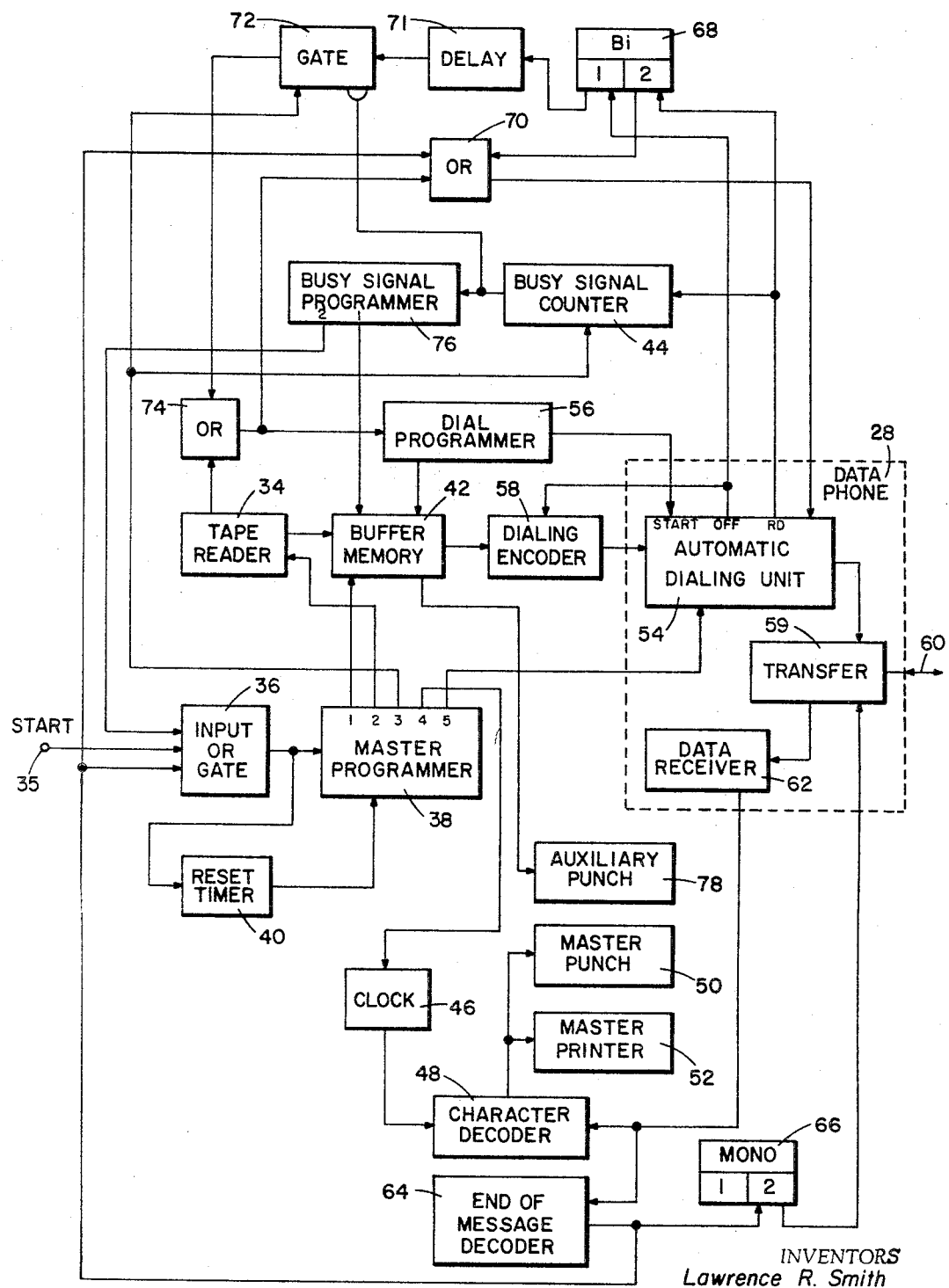
FIG. 2 is a block diagram of the cenrtal station equipment included in the system of FIG. 1.

FIG. 2 illustrates the central station monitor 20 and the data phone 28 of FIG. 1. The telephone number of each remote station which is to be interrogated is stored on a tape positioned in tape reader 34. When it is desired to interrogate a remote station a start pulse is applied to input OR gate 36 from starting control 35. The output of OR gate 36 is coupled to master programmer 38 and reset timer 40 starting the operation of both of these devices. The first step of master programmer 38 clears buffer memory 42 of any data contained therein. The second step of master programmer 38 couples a signal to tape reader 34, causing the tape reader to read the telephone number of the first station to be called into buffer memory 42. The third step of master programmer 38 clears busy signal counter 44 and opens gate 72. The fourth step of master programmer 38 actuates clock 46 causing the real time to be applied to character decoder 48. Character decoder 48 couples the real time data to master punch 50 and master printer 52 for recordation in these devices. The last step of master programmer 38 applies a signal to automatic dialing unit 54 of data phone 28, connecting the central station equipment to the data phone.

When the data phone is ready to receive dial information from the central station product monitor 20, it applies a signal to dial programmer 56. Dial programmer 56 applies a signal to buffer memory 42 causing buffer memory 42 to read the first digit of the telephone number into dialing encoder 58. Dialing encoder 58 encodes the first digit of the telephone number in a code form suitable for use by the automatic dialing unit and couples this coded signal to automatic dialing unit 54. Automatic dialing unit 54 transmits the first digit to communication channel 60 through transfer switch 59. After the first number has been transmitted, automatic dialing unit 54 transmits an off pulse to dialing encoder 58 erasing the first digit contained therein. Then automatic dialing unit 54 again transmits a pulse to dial programmer 56 causing dial programmer 56 to apply a signal to buffer memory 42. The second digit of the telephone number is then read into dialing encoder 58. Dialing encoder 58 encodes the second digit and couples it to automatic dialing unit 54 where it is transferred through transfer switch 59 for transmission over communication channel 60. This process is repeated until the entire telephone number stored in buffer memory 42 has been transmitted.

The code form used in transmitting numbers in this system may be the binary coded decimal form. In this system, each decimal digit of a number is represented by a four bit binary number. While the system may use a binary coded decimal code, it is not restricted to this code and any suitable coding form may be used.

In the system described, the binary information is carried in the form of tones. In the commercial equipment presently used, and 14 tones are grouped in 3 channels. Two channels have five separate frequencies each, while the third channel has four separate frequencies. Only one frequency from each channel can be transmitted at a time. In transmitting a binary coded decimal digit three tones are transmitted simultaneously, one from each channel.

Dialing by the automatic dialing unit 54 continues until all the digits of the telephone number have been dialed. After the last digit of the number has been dialed, and a call has been completed to the telephone at the remote station a valid answer signal is sent back on the telephone line to the data phone 28. Transfer switch 59 than operates to transfer communication channel 60 to data receiver 62. After the connection has been made with the remote station the data stored therein is automatically transmitted to the central station, where it is received by data receiver 62. The operation of the remote station equipment will be described in a subsequent portion of this specification.

Data receiver 62 couples the message information received from the remote station to character decoder 48 which decodes the message. The decoded message is coupled to master punch 50 and master printer 52 for recordation. Master printer 52 prints the information adjacent the time previously received from clock 46. Master punch 50 is used to punch a master tape which may be used in other automatic equipment. While a printer and a punch have been shown as recording devices the system is not limited to these devices, but any devices of this nature may be used, either in conjunction with the devices shown or alone.

At the end of the message received from the remote station, an end-of-message signal is transmitted. This signal is coupled to end-of-message decoder 64 which decodes the signal and applies it to monostable multivibrator 66, causing this multivibrator to be shifted to its unstable state. The output signal generated by monostable multivibrator 66 is coupled to data phone transfer switch 59 causing transfer switch 59 to couple automatic dial unit 54 to communication channel 60. The output of end-of-message decoder 64 is also coupled to a master programmer 38 through input OR gate 36, causing master programmer 38 to again start its cycle for transmission of a second telephone number.

Reset timer 40 which was initially set by the input from input OR gate 36 is again reset at the beginning of its timing cycle by the output of end-of-message decoder 64 coupled to the reset timer through input OR gate 36. Reset timer 40 acts to start master programmer 38 if for some reason no start signal should be received from input OR gate 36 at the end of the properly received message from a remote station, or at the end of a call repeating cycle.

After reeciving the end-of-message signal from the remote station being interrogated, the above operation is repeated for the second telephone number stored in tape reader 34. If all the numbers dialed are answered properly, the central station equipment dials all of the numbers on the tape and tape reader 34 then shuts off automatically. If a given telephone number is dialed but no answer is received, provision is made for redialing the number a predetermined number of times. If no answer is received after redialing, provision is made for recording the unanswered number so that subsequent action may be taken.

Automatic dialing unit 54 includes a timer for limiting the waiting period for receiving an answer from the remote station. In a particular model of commercially furnished equipment this timer has a 40 second period. At the end of the period determined by the timer in automatic dialing unit 54, a redial command is generated which is coupled to busy signal counter 44 and bistable multivibrator 68.

The signal applied to bistable multivibrator 68 causes this multivibrator to shift to its second stable state and produce an output signal which is coupled to OR gate 70. The output signal from OR gate 70 is coupled back to automatic dialing unit 54 conditioning automatic dialing unit 54 to accept a telephone number for dialing. Automatic dialing unit 54 then supplies an off command to dialing encoder 58 to remove the last digit from dialing encoder 58, as previously described. This off command also goes to bistable multivibrator 68 causing the multivibrator to be shifted to its first stable state. The output signal produced when bistable multivibrator 68 is shifted to its first stable state is coupled to gate 72 through delay network 71. Gate 72 has been previously enabled by the signal from the third step of master programmer 38 so that an output signal from gate 72 is applied to dial programmer 56 through OR gate 74. Dial programmer 56 then proceeds to dial the number again as previously described.

Each time the number is redialed a count is stored in busy signal counter 54. When a predetermined number of counts has been stored, an output signal from busy signal counter 44 is applied to busy signal programmer 76 and automatic dialing unit 54 through OR gate 70. The signal to the automatic dialing unit conditions the dialing unit to receive another telephone number. The output signal from busy signal counter 44 to gate 72 blocks this gate so that the subsequent commands to the dial programmer 56 are blocked. Busy signal programmer 76 applies an output to buffer memory 42, clearing the memory of the telephone number which has been stored therein, and also transferring the number to auxiliary punch 78, so that a record of unanswered numbers will be made. The second output from busy signal programmer 76 is applied to master programmer 38 and reset timer 40 through input OR gate 36 starting the cycle so that a subsequent number will be dialed.

The above equipment automatically dials a predetermined list of telephone numbers. If a valid answer is received, the data transmitted from the remote station is recorded. If no answer is received, the remote station is redialed a predetermined number of times and if no contact can be made with the remote station, the telephone number of this station is recorded for subsequent action.

FIG. 3 illustrates data phone 30 and remote station product monitor 16 of FIG. 1. These units are positioned at each remote station for recording and transmitting the data obtained at remote stations to the central station.

Remote station product monitor 16 includes a clock generaor 90 having an input sync signal which may be the 60 cycle power normally obtainable at a remote station. From the 60 cycle sync signal, clock generator 90 produces a clock output signal of, for example, 60 c.p.s. and $\phi A$ and $\phi B$ sync signals of, for example, 7½ c.p.s. $\phi A$ and $\phi B$ sync signals have the same repetition rate but alternate in their sequence. The $\phi A$ signal is coupled to sync bit generator 92 to produce a sync bit which is in phase with the $\phi A$ sync signal. Sync bit generator 92 is operative only when the remote station is transmitting to the central station. These sync signals are used throughout the system to provide the proper timing for operation of the various units.

As previously described many products can be monitored at each station. In the system to be described the sales of two products will be monitored. However, the system can be expanded to an indefinite number of products as desired. In addition to monitoring more than one product the system can monitor product sales from more than one outlet. For example, in a retail gasoline station there may be 3 or 4 pumps, each dispensing premium gasoline. In this system the output of each pump is coupled to a common storage unit so that the total sales of premium gasoline from the station will be properly recorded. If it is desired to monitor the sales from each individual pump, the pumps can be treated as dispensing individual products. While the system to be described shows means for combining the output of several product dispensers in a single data storage means, it is not necessary to do this. For example, the data storage means could be coupled directly to a flow meter at the output of a storage tank supplying several pumps to record the output of the pumps directly. If this is done, it is not necessary to use the buffer storage means and the scanning circuitry for transferring data from the buffer storage means to the data storage means.

As shown in FIG. 3, each pump separately measures the product dispensed by it and sends pulse signals to the remote station monitor to record the amount of product dispensed. Since the pulses arrive randomly, it is necessary that provision be made to prevent interference between two pulses arriving at the same time.

The pulses arriving from gasoline pumps dispensing, for example, regular gasoline, are coupled to buffer storage units 94 and 96, the input to each buffer storage unit being from a separate pump. Buffer storage units 94 and 96 are continuously scanned by input scanner 98 as follows. Anti-smear gate 100 is actuated by a $\phi B$ pulse coupled thereto through delay 102. The $\phi B$ pulse is coupled through anti-smear gate 100 to input scanner 98 actuating the input scanner. Input scanner 98 is driven through its scanning cycle by clock pulses from clock generator 90 which have a very much higher repetition rate than the $\phi B$ sync pulses. Thus, input scanner 98 completes its cycle before the next $\phi B$ pulse is applied to anti-smear gate 100. When input scanner 98 has completed scanning buffer storage units 94 and 96 it remains at rest until a subsequent delayed $\phi B$ pulse is applied thereto.

Input scanner 98 reads buffer storage units 94 and 96 in sequence transferring the contents of these buffer storage units to data storage 104. Data storage 104 accumulates the input data from buffer storage units 94 and 96 and shows the total product sales of that particular product.

Buffer storage units 106 and 108, input scanner 110, delay 114, anti-smear gate 112 and data storage 116 operate in the same manner. However, the inputs to buffer storage units 106 and 108 are from other product dispensers, as for example, pumps dispensing premium gasoline.

When a call is received from the central station over data phone 30, data phone receiver 118 produces an output signal which is coupled to start pulse gate 120 enabling this gate to produce a start pulse when a $\phi B$ pulse is applied to gate 120. The start pulse from pulse gate 120 is applied to sync bit generator 92 to cause this generator to produce sync bit signal in phase with the $\phi A$ sync signal. The sync bit signal is applied to sync tone gate 130 enabling this tone gate during the duration of each of the sync bits. The output signal from start pulse gate 120 is also to alarm scanner 132.

It is desirable to be able to monitor functions at the remote station to make sure that the station is operating properly. In this example provision is made for three alarms, however, an indefinite number of alarms can be incorporated in the system. Pulsator continuity alarm gate 134 monitors the pulsators which produce the data signals from the product dispensers. If there is a malfunction in the pulsator units, the product sales count will not be accurate. Any discontinuity in the pulsator circuit is recorded in pulsator continuity alarm gate 134 enabling this gate. A DC alarm gate 138 is also provided to record any loss of DC power in the system since the last interrogation. An additional alarm gate 136 is provided to monitor desired alarms at the remote station. Alarm gates 134 and 136 are enabled when there is a malfunction and remain enabled until the malfunction is cleared. Alarm gate 138 remains enabled after a malfunction until cleared by the next readout.

When alarm scanner 132 is actuated, $\phi B$ sync pulses cause it to scan through its operating steps to read out the information stored in the alarm gates. The alarm signal is the first signal sent back from the remote station to the central station. In step one, alarm scanner 132 applies a read signal to each of the alarms 134, 136 and 138. Any of the alarms which are enabled produce an output signal which is coupled to the appropriate tone gate. Three tones are actuated at the same time and describe the condition of the alarm at the remote station. If, for example, no alarm is actuated the tones indicating the binary number 000 would be transmitted. If the auxiliary alarm 136 were actuated, the binary number 010 would be transmitted. The tones are coupled to a data phone transmitter 119 for transmission to the central station over communication channel 60.

The signal transmitted from the remote station consists of alternate information and sync signals. The information signals consist of three tones, while the sync signal consists of a single tone. The sync tone is generated by sync tone gate 130, which is actuated by the output from sync bit generator 92 and is in phase with $\phi A$ sync signal. $\phi B$ sync pulses are applied to sync tone gate 130 to turn off the gate. $\phi A$ sync signals are also applied to the tone gates 122 through 128 to block these tone gates during the transmission of the sync tone.

When alarm scanner 132 is stepped to its second position an output pulse is produced which is coupled to identity scanner 140 to actuate the scanner. The output signal from step two of alarm scanner 132 is also coupled to tab gate 142. The output of tab gate 142 is coupled to the proper tone gates to transmit a tabulation signal to the central station. Identity scanner 140 is stepped by $\phi B$ sync pulses to cause transmission of signals identifying the station being interogated. Identity control gates 144, 146 and 148 are operated in sequence by identity scanner 140 and provide proper outputs to tone gates 122, 124, 126 and 128 to transmit the three binary coded decimal numbers which identify the remote station. After the transmission of the identity signal, the output signal from scanner 140 is coupled to read scanner 150 to actuate this scanner and to tab gate 142 to transmit a tabulation signal. The signal from identity scanner 140 also blocks anti-smear gate 112 to prevent input scanner 110 from scanning buffer units 106 and 108 while the data storage 116 is being read.

After actuation of read scanner 150 by the output pulse from identity scanner 140, read scanner 150 scans data storage 116 to read out in sequence each digit of the number stored therein. This number represents the total sales of a product and is transmitted digit by digit to the tone gates 122, 124, 126 and 128 to generate the tone signals which represent the digit to be transmitted to the central station. When read scanner 150 reaches its last step an output signal is generated which resets anti-smear gate 112, actuates read scanner 152, and disables anti-smear gate 100. The signal is also coupled to tab gate 142 to generate a tabulation signal as before.

Read scanner 152 is stepped by $\phi B$ pulses to read the information contained in data storage 104 and to energize the desired tone gates 122, 124, 126 and 128 for generation of the proper tone signals. The output signal from the last step of read scanner 152 is coupled to anti-smear gate 100 to reset this gate. This output from read scanner 152 can also be coupled to a subsequent read scanner in the series to transmit additional data and this operation can continue for as many read scanners as are necessary to monitor all the products at the station. The system can be easily expanded to monitor the sales of additional products merely by adding more modules containing a read scanner, data storage, anti-smear gate, input scan and buffer storage units. This produces a very flexible system which can be easily adapted to changing conditions of marketing and inventory.

In this example, only two products are monitored so that output of the last step of read scanner 152 becomes an end-of-message signal. This signal is coupled to the proper tone gates 122, 124, 126 and 128 to generate an end-of-message code and also to message end gate 154 and sync bit generator 92 to turn off the sync bit signal. Message end gate 154 produces an output signal which is coupled to data phone 30 to reconnect the receiver to the line for proper reception of a subsequent message.

A data acquisition system has been described in which a central station dials the telephone numbers of remotely located stations and acquires data from the remote stations over telephone facilities on a programmed basis. The central station calls remote stations automatically and the remote stations transmit data to the central station automatically. A large number of widely scattered remote stations can be monitored and the remote stations can be interrogated during hours of low telephone usage without requiring that the station be open or that an operator be present. Provisions are made for handling unanswered calls. Provisions are also made for monitoring the operation of the system at each remote station in order that malfunctions may be detected.

We claim:

1. A data acquisition system for transmitting data stored at a plurality of remote stations to a central station over a communication channel coupled between the central and remote stations, said data acquisition system including in combination, central station memory means for storing a plurality of signals identifying each of said remote stations, central station transmission means coupled to the communication channel, programming means coupled to said central station memory means and said central station transmission means, said programming means acting to transfer said identifying signals sequentially from said central station memory means to said central station transmission means, said central station transmission means being responsive to each of said identifying signals to cause a first actuating signal to be applied to a particular remote station, remote station transmission means for transmitting data to the central station, remote station receiver means coupled to the communication channel for receiving said first actuating signal and developing a second actuating signal in response thereto, said remote station receiver means further being responsive to said first actuating signal to decouple said remote station receiver means from the communication channel and to couple said remote station transmission means to the communication channel, a plurality of data storage means positioned at the remote station and coupled to said remote station transmission means, a plurality of scanner means each coupled to a separate one of said data storage means, said plurality of scanner means further being coupled in series to form a sequence of scanner means including a first scanner means and a last scanner means, said first scanner means being coupled to said remote station receiver means and responsive to said second actuating signal to cause the data stored in said data storage means coupled thereto to be transferred to said remote station transmission means for transmission over the communication channel to the central station and to generate a control signal which is coupled to the subsequent scanner means in said sequence upon the completion of said transfer of data, each of said scanner means in said sequence after said first scanner means being responsive to the control signal generated by the scanner means preceding it in said sequence to cause the data stored in a respective one of said data storage means coupled thereto to be transferred to said remote station transmission means and to generate a control signal which is coupled to the subsequent scanner means in said sequence, said control signal from said last scanner means being coupled to said remote station transmission means to cause the same to transmit an end of message signal to the central station and to decouple said remote station transmission means from the communication channel and to recouple said remote station receiver means thereto, central station receiving means coupled to the communication channel for receiving said data from the remote station and recording means coupled to said central station receiving means for recording said data from the remote station.

2. A data acquisition system for transmitting data stored at a plurality of remote stations to a central station over a communication channel coupled between the central and remote stations, said data acquisition system including in combination, central station memory means for storing a plurality of signals identifying each of said remote stations, central station transmission means coupled to the communication channel, programming means coupled to said central station memory means and said central station transmission means, said programming means acting to transfer said identifying signals sequentially from said central station memory means to said central station transmission means, said central station transmission means being responsive to each of said identifying signals to cause a first actuating signal to be applied to a particular remote station, remote station transmission means for transmitting data to the central station, remote station receiver means coupled to the communication channel for receiving the first actuating signal and developing a second actuating signal in response thereto, said remote station receiver means further being responsive to said first actuating signal to decouple said remote station receiver means from the communication channel and to couple said remote station transmission means to the communication channel, a plurality of data storage means positioned at the remote station and coupled to said remote station transmission means, a plurality of input buffer storage means each adapted to receive data at a first rate, a plurality of input scanner means each coupled to a separate one of said plurality of data storage means, a plurality of circuit means each coupling a separate one of said input scanner means to at least one of said input buffer storage means, each of said input scanner means acting to transfer sequentially data stored in said input buffer storage means coupled thereto to said data storage means at a rate faster than said first rate, a plurality of output scanner means each coupled to a separate one of said data storage means, said plurality of output scanner means further being coupled in series to form a sequence of output scanner means including a first output scanner means and a last output scanner means, said first output scanner means being coupled to said remote station receiver means and responsive to said second actuating signal to cause the data stored in said data storage means coupled thereto to be transferred to said remote station transmission means for transmission over the communication channel to the central station and to generate a control signal which is coupled to the subsequent output scanner means in said sequence upon the completion of said transfer of data, each of said output scanner means in said sequence after said first output scanner means being responsive to the control signal generated by the output scanner means preceding it in said sequence to cause the data stored in a respective one of said data storage means coupled thereto to be transferred to said remote station transmission means and to generate a control signal which is coupled to the subsequent output scanner means in said sequence, said control signal from said last output scanner means being coupled to said remote station transmission means to cause the same to transmit an end of message signal to the central station and to decouple said remote station transmission means from the communication channel and to recouple said receiver means thereto, central station receiving means coupled to the communication channel for receiving said data from the remote station and recording means coupled to said central station receiving means for recording said data from the remote station.

3. A data acquisition system for transmitting data stored at a remote station to a central station over a communication channel in response to an actuating signal from the central station, said data acquisition system including in combination, transmisison means and receiver means coupled to the communication channel, data storage means positioned at the remote station and coupled to said transmission means, a plurality of input buffer storage means each adapted to receive data at a first rate coupled to said data storage means, first scanner means coupled to each of said plurality of input buffer storage means, clock means for developing a first clock signal having a rate greater than said first rate and a second clock signal, gate means coupling said clock means to said first scanner means for applying said first clock signal thereto, said first scanner means being responsive to said first clock signal to cause said data stored in said plurality of input buffer storage means to be transferred sequentially to said data storage means, second scanner means coupled to said clock means, said data storage means and said receiver means, first circuit means coupling said receiver means to said gate means, said receiver means being responsive to the actuating signal to open said gate means whereby said first scanner means ceases transferring data from said input buffer storage means to said data storage means, said receiver means further being responsive to the actuating signal to actuate said second scanner means, said actuated second scanner means being responsive to said second clock signal to transfer the data stored in said data storage means to said transmission means for transmission over the communication channel to the central station, said second scanner means further acting to generate a control signal upon completion of said transfer of data stored in said data storage means, second circuit means coupling said second scanner means to said gate means, said gate means being responsive to said control signal to close said gate means whereby said first scanner means resumes transferring data from said input buffer storage means to said data storage means.

4. A data acquisition system for transmitting data stored at a remote station to a central sation over a communication channel in response to a first actuating signal from the central station, said data acquisition system including in combination, transmission means for transmitting data to the central station, receiver means coupled to the communication channel for receiving the first actuating signal and developing a second actuating signal in response thereto, said receiver means further being responsive to the first actuating signal to decouple said receiver means from the communication channel and to couple said transmission means to the communication channel, a plurality of data storage means positioned at the remote station and coupled to said transmission means, a plurality of scanner means each coupled to a separate one of said data storage means, said plurality of scanner means further being coupled in series to form a sequence of scanner means including a first scanner means and a last scanner means, said first scanner means being coupled to said receiver means and responsive to said second actuating signal to cause the data stored in said data storage means coupled thereto to be transferred to said transmission means and to generate a control signal which is coupled to the subsequent scanner means in said sequence upon the completion of said transfer of data, each of said scanner means in said sequence after said first scanner means being responsive to the control signal generated by the scanner means preceding it in said sequence to cause the data stored in said data storage means coupled thereto to be transferred to said transmission means and to generate a control signal which is coupled to the subsequent scanner means in said sequence, said control signal from said last scanner means being coupled to said transmission means to cause the same to transmit an end of message signal to the central station and to decouple said transmission means from the communication channel and to recouple said receiver means thereto.

5. A data acquisition system for transmitting data stored at a remote station to a central sation over a communication channel in response to a first actuating signal from the central station, said data acquisition system including in combination, transmission means for transmitting data to the central station, receiver means coupled to the communication channel for receiving the first actuating signal and developing a second actuating signal in response thereto, said receiver means further being responsive to the first actuating signal to decouple said receiver means from the communication channel and to couple said transmission means to the communication channel, a plurality of data storage means positioned at the remote station and coupled to said transmission means, a plurality of input buffer storage means each adapted to receive data at a first rate, a plurality of input scanner means each coupled to a separate one of said plurality of data storage means, a plurality of circuit means each coupling a separate one of said input scanner means to at least one of said input buffer storage means, each of said input scanner means acting to transfer sequentially data stored in said input buffer storage means coupled thereto to said data storage means at a rate faster than said first rate, a plurality of output scanner means each coupled to a separate one of said data storage means, said plurality of output scanner means further being coupled in series to form a sequence of output scanner means including a first output scanner means and a last output scanner means, said first output scanner means being coupled to said receiver means and responsive to said second actuating signal to cause the data stored in said data storage means coupled thereto to be transferred to said transmission means and to generate a control signal which is coupled to the subsequent output scanner means in said sequence upon the completion of said transfer of data, each of said output scanner means in said sequence after said first output scanner means being responsive to the control signal generated by the output scanner means preceding it in said sequence to cause the data stored in said data means coupled thereto to be transferred to said transmission means and to generate a control signal which is coupled to the subsequent output scanner means in said sequence, said control signal from said last output scanner means being coupled to said transmission means to cause the same to transmit an end of message signal to the central station and to decouple said transmission means from the communication channel and to recouple said receiver means thereto.

References Cited
UNITED STATES PATENTS

| | | | |
|---|---|---|---|
| 2,591,617 | 4/1952 | Savino | 340—150 |
| 2,870,258 | 1/1959 | Cooper | 179—2 |
| 3,098,215 | 7/1963 | Waite | 340—172.5 |
| 3,109,068 | 10/1963 | Boyd et al. | 340—147 |
| 3,142,726 | 7/1964 | Brothman et al. | 179—2 R |
| 3,179,931 | 4/1965 | Middaugh | 340—152 |
| 3,223,977 | 12/1965 | David et al. | 340—147 |
| 3,266,018 | 8/1966 | Higgins | 179—2 |
| 3,299,210 | 1/1967 | Bandy | 340—172.5 |
| 3,314,051 | 4/1967 | Willcox et al. | 340—172.5 |
| 3,317,672 | 5/1967 | Cestaro | 340—150 |

OTHER REFERENCES

Carnevale, R. J., Address Arrangement for Expandable Modular Storage. In IBM Tech. Disclosure Bull. 7 (8): pp. 703–704, January 1965.

ROBERT C. BAILEY, *Primary Examiner.*

J. P. VANDENBURG, *Assistant Examiner.*